US012539666B2

(12) United States Patent
Tsuboi (10) Patent No.: US 12,539,666 B2
(45) Date of Patent: Feb. 3, 2026

(54) METHOD FOR MANUFACTURING MOLDING DIE, AND MOLDING DIE (71) Applicant: SEIKO EPSON CORPORATION, Tokyo (JP)

(72) Inventor: Tatsuya Tsuboi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 188 days.

(21) Appl. No.: 18/321,937

(22) Filed: May 23, 2023

(65) Prior Publication Data
US 2023/0382042 A1    Nov. 30, 2023

(30) Foreign Application Priority Data
May 25, 2022  (JP) .................. 2022-085053

(51) Int. Cl.
| B29C 64/165 | (2017.01) |
| B29C 33/38  | (2006.01) |
| B29K 505/12 | (2006.01) |
| B29L 31/00  | (2006.01) |
| B33Y 10/00  | (2015.01) |
| B33Y 70/10  | (2020.01) |
| B33Y 80/00  | (2015.01) |

(52) U.S. Cl.
CPC ........ *B29C 64/165* (2017.08); *B29C 33/3842* (2013.01); *B29K 2505/12* (2013.01); *B29L 2031/757* (2013.01); *B33Y 10/00* (2014.12); *B33Y 70/10* (2020.01); *B33Y 80/00* (2014.12)

(58) Field of Classification Search
CPC ..... B29C 64/188; B29C 64/10; B29C 64/106; B29C 64/112; B29C 64/118; B29C 33/3842; B29L 2031/757; B33Y 80/00; B33Y 70/00
See application file for complete search history.

(56) References Cited

U.S. PATENT DOCUMENTS

| 4,365,047 A * | 12/1982 | Ohkawa | C08F 299/0442 525/29 |
| 10,751,951 B1* | 8/2020 | Nguyen | B22F 7/062 |
| 11,591,484 B1* | 2/2023 | Schaedler | C09D 11/101 |
| 2004/0062873 A1* | 4/2004 | Jung | C09D 7/48 427/407.1 |
| 2005/0153157 A1* | 7/2005 | Matsubayashi | C22C 38/10 428/626 |
| 2008/0303439 A1* | 12/2008 | Kim | H01J 11/46 252/519.31 |
| 2018/0319110 A1* | 11/2018 | Solgaard | B29C 71/04 |
| 2020/0123379 A1* | 4/2020 | Waicukauski | C08L 75/06 |

(Continued)

FOREIGN PATENT DOCUMENTS

| JP | 2017-124593 A | 7/2017 |
| JP | 2019-509192 A | 4/2019 |

(Continued)

*Primary Examiner* — Nahida Sultana
(74) *Attorney, Agent, or Firm* — Spencer Fane LLP (57) ABSTRACT A method for manufacturing a molding die used with an injection molder, the method including plasticizing a creating material containing metal particles and resin to produce a plasticized material, and dispensing the plasticized material toward a stage to stack layers on each other to create a laminate that forms at least a portion of the molding die, with an average particle diameter $D_{50}$ of the metal particles being smaller than or equal to 23 μm.

9 Claims, 7 Drawing Sheets (56) References Cited

U.S. PATENT DOCUMENTS

2021/0339463 A1\* 11/2021 Hikmet ................. B29C 64/336
2022/0176620 A1    6/2022 Anegawa et al.

FOREIGN PATENT DOCUMENTS

| JP | 2019-518864 A | 7/2019 |
| JP | 2022-007167 A | 1/2022 |
| JP | 2022-090380 A | 6/2022 |
| WO | 2017/106787 A2 | 6/2017 |
| WO | 2017/157851 A1 | 9/2017 |

\* cited by examiner

| | AVERAGE PARTICLE DIAMETER [μm] | | | SURFACE ROUGHNESS [μm] | |
|---|---|---|---|---|---|
| | $D_{10}$ | $D_{50}$ | $D_{90}$ | BEFORE INJECTION MOLDING | AFTER INJECTION MOLDING |
| EXAMPLE 1 | 2.131 | 4.067 | 6.558 | 0.53 | 1.38 |
| COMPARATIVE EXAMPLE 1 | 9.254 | 23.57 | 49.36 | 2.20 | 2.75 |

METHOD FOR MANUFACTURING MOLDING DIE, AND MOLDING DIE

The present application is based on, and claims priority from JP Application Serial Number 2022-085053, filed May 25, 2022, the disclosure of which is hereby incorporated by reference herein in its entirety.

BACKGROUND

1. Technical Field

The present disclosure relates to a method for manufacturing a molding die, and a molding die.

2. Related Art

There is a known injection molder that molds a molded product by injecting a material plasticized by a plasticizer into a cavity of a molding die to harden the injected material.

For example, JP-A-2017-124593 describes that a molding die for an injection molder is created by using a three-dimensional creator. The three-dimensional creator can create integrated shapes that could not be made in related art. The molding die described in JP-A-2017-124593 is made of resin or metal.

A molding die made of resin, however, has low thermal conductivity, so that heat builds up in the molding die, and it takes time to cool the molding die. On the other hand, a molding die made of metal has high thermal conductivity, so that the material undesirably hardens before the cavity of the molding die is filled with the material, and filling failure therefore tends to occur. Furthermore, the molded product molded in the molding die is subjected to rapid cooling and therefore tends to warp.

SUMMARY

A method for manufacturing a molding die according to an aspect of the present disclosure is a method for manufacturing a molding die used with an injection molder, the method including plasticizing a creating material containing metal particles and resin to produce a plasticized material, and dispensing the plasticized material toward a stage to stack layers on each other to create a laminate that forms at least a portion of the molding die, and an average particle diameter $D_{50}$ of the metal particles is smaller than or equal to 23 μm.

A molding die according to another aspect of the present disclosure is a molding die used with an injection molder, the molding die including a laminate containing metal particles and resin, and an average particle diameter $D_{50}$ of the metal particles is smaller than or equal to 23 μm.

DESCRIPTION OF EXEMPLARY EMBODIMENTS

A preferable embodiment of the present disclosure will be described below in detail with reference to the drawings. It is not intended that the embodiment described below unduly limits the contents of the present disclosure described in the claims. Furthermore, all configurations described below are not necessarily essential configuration requirements of the present disclosure.

1. Injection Molder
1.1. Overall Configuration

Figure 1:
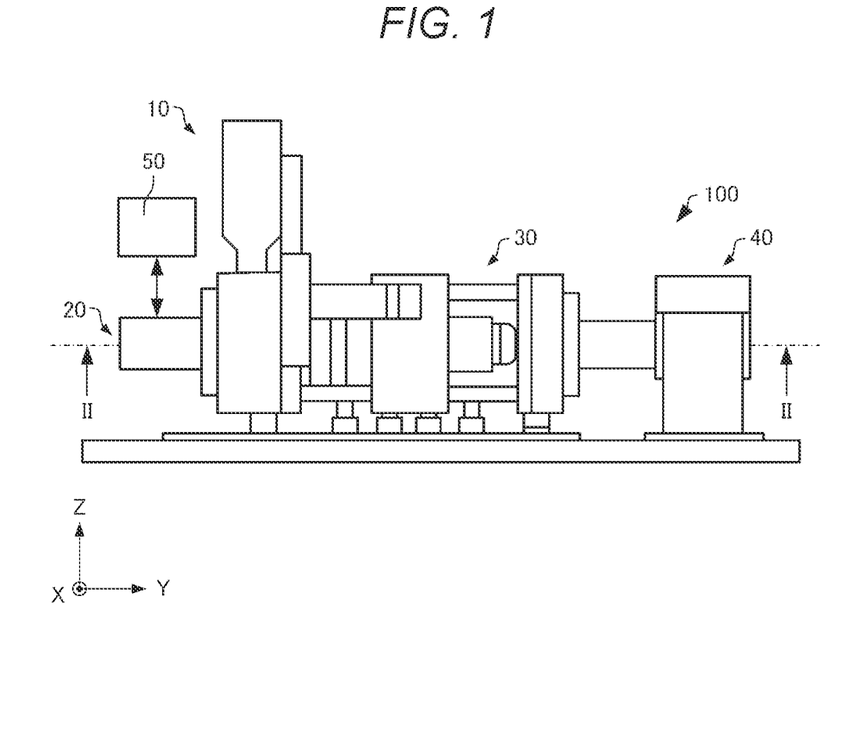
FIG. 1 is a side view diagrammatically showing an injection molder according to an embodiment of the present disclosure.

An injection molder according to the present embodiment will first be described with reference to the drawings. FIG. 1 is a side view diagrammatically showing an injection molder 100 according to the present embodiment. FIG. 1 shows axes X, Y, and Z as three axes perpendicular to one another. The X-axis and Y-axis directions are each, for example, the horizontal direction. The Z-axis direction is, for example, the vertical direction.

The injection molder 100 includes, for example, a material supplier 10, an injector 20, a die section 30, a die clamper 40, and a controller 50, as shown in FIG. 1.

The material supplier 10 supplies the injector 20 with a material that forms a raw material. The material supplier 10 is formed of a hopper. The material is supplied from the material supplier 10, for example, in the form of pellets or powder. The material supplied by the material supplier 10 is, for example, acrylonitrile butadiene styrene (ABS) resin.

The injector 20 plasticizes the material supplied from the material supplier 10 into plasticized material. The injector 20 then injects the plasticized material toward the die section 30.

The term "plasticization" is a concept including melting and is transformation from a solid state into a fluid state. Specifically, in the case of a material that undergoes glass transition, the plasticization is the process of raising the temperature of the material to be higher than or equal to the glass transition point thereof. In the case of a material that does not undergo glass transition, the plasticization is the process of raising the temperature of the material to be higher than or equal to the melting point thereof.

A cavity corresponding to the shape of a molded product is formed in the die section 30. The plasticized material injected from the injector 20 flows into the cavity. The plasticized material is then cooled and solidified to produce the molded product.

The die clamper 40 opens and closes a molding die in the die section 30. The die clamper 40 opens the molding die in the die section 30 after the plasticized material is cooled and solidified. The molded product is thus discharged out of the die section 30.

The controller 50 is formed, for example, of a computer including a processor, a primary storage, and an input/output interface via which signals are inputted from and outputted to an external apparatus. The controller 50, for example, performs a variety of functions when the processor executes a program read into the primary storage. Specifically, the controller 50 controls the injector 20 and the die clamper 40. The controller 50 may be formed of a combination of a plurality of circuits in place of the computer.

1.2. Specific Configuration

Figure 2:
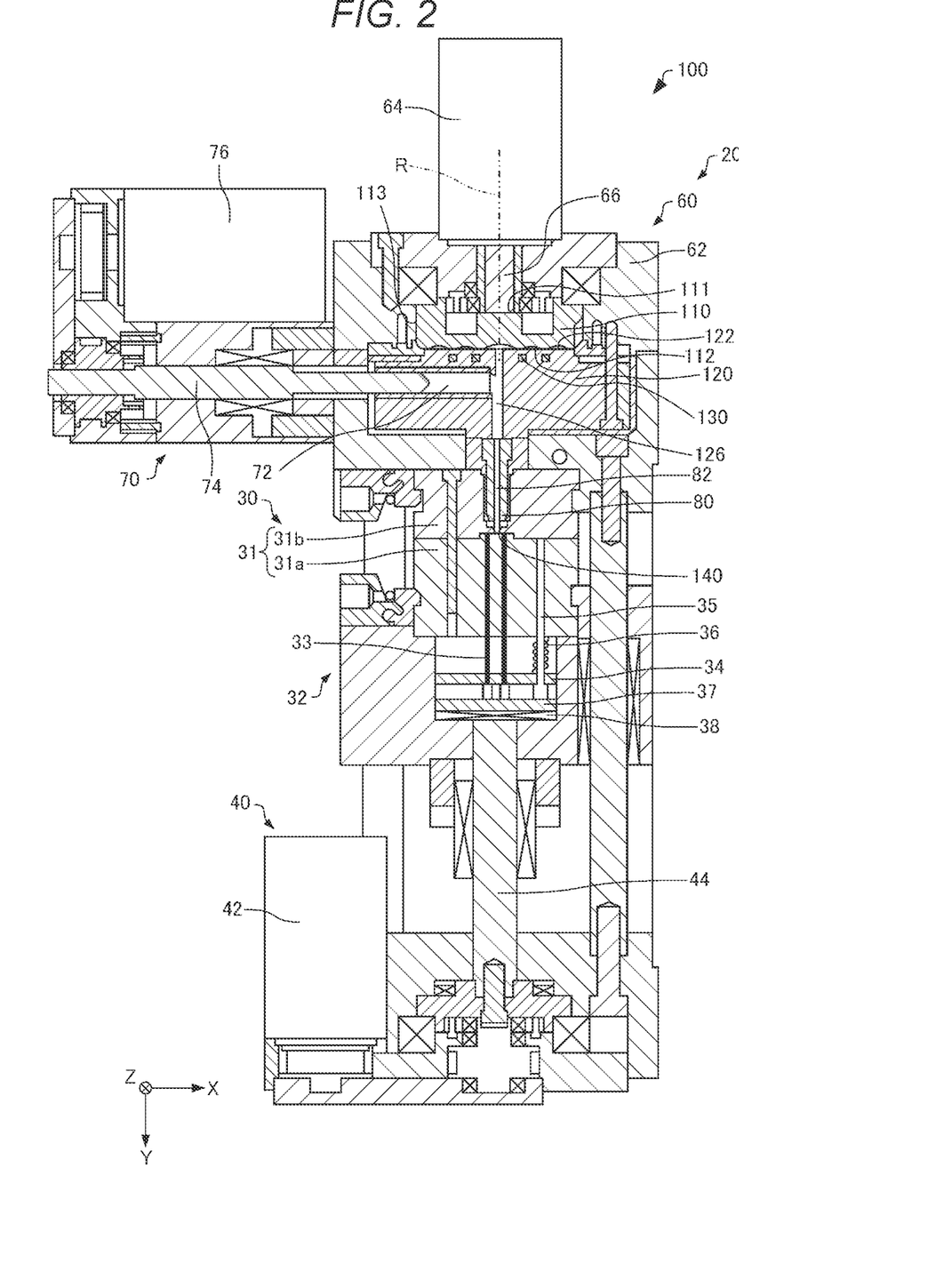
FIG. 2 is a cross-sectional view diagrammatically showing the injection molder according to the embodiment.

FIG. 2 is a cross-sectional view of the injection molder 100 taken along the line II-II in FIG. 1, which diagrammatically shows the injection molder 100. The injector 20 includes, for example, a plasticizer 60, an injection mechanism 70, and a nozzle 80, as shown in FIG. 2.

The plasticizer 60 is configured to plasticize the material supplied from the material supplier 10 to produce a plasticized material in the form of paste having fluidity and guide the plasticized material to the injection mechanism 70. The plasticizer 60 includes, for example, a screw enclosure 62, a drive motor 64, a flat screw 110, a barrel 120, and a heater 130.

The screw enclosure 62 is an enclosure that houses the flat screw 110. The flat screw 110 is housed in the space surrounded by the screw enclosure 62 and the barrel 120.

The drive motor 64 is coupled to the screw enclosure 62. The drive motor 64 rotates the flat screw 110. The drive motor 64 is, for example, a servo motor. A shaft 66 of the drive motor 64 is coupled to the flat screw 110. The drive motor 64 is controlled by the controller 50. Although not shown, the shaft 66 of the drive motor 64 may be coupled to the flat screw 110 via a speed reducer.

Figure 3:
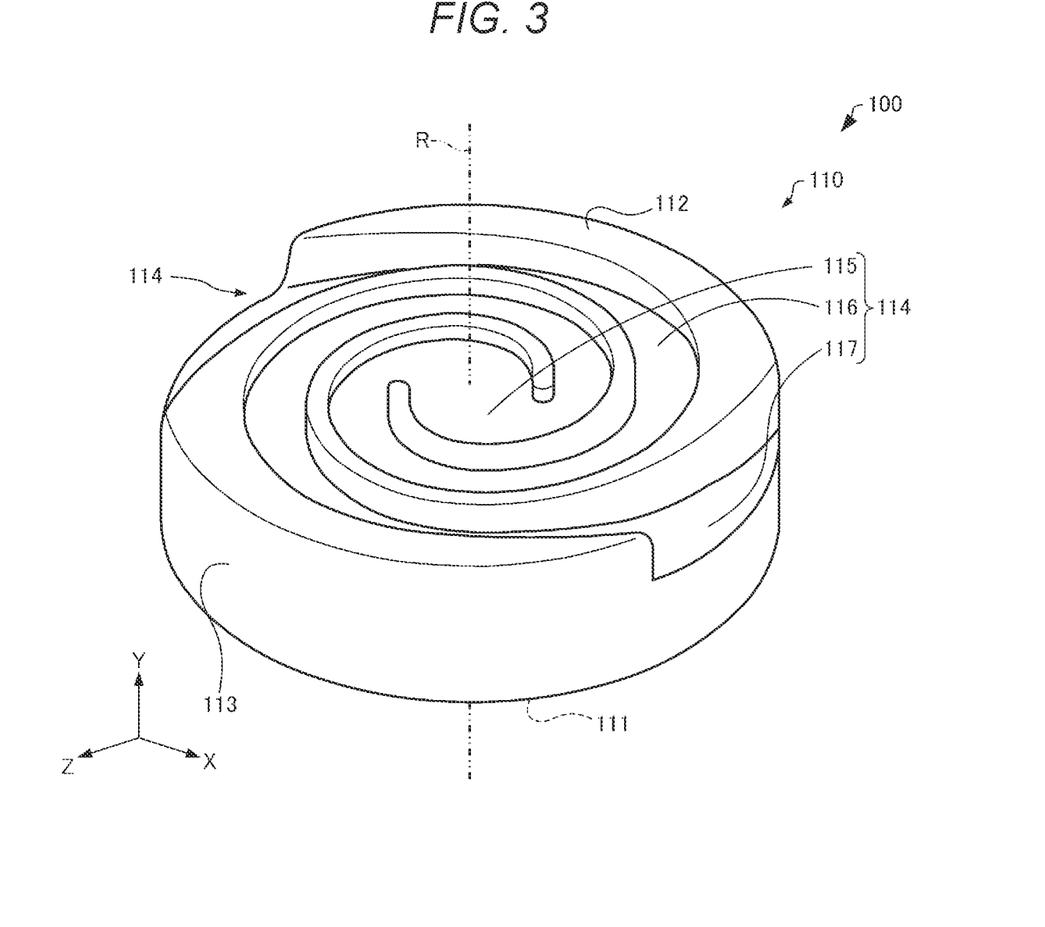
FIG. 3 is a perspective view diagrammatically showing a flat screw of the injection molder according to the embodiment.

The flat screw 110 has a substantially circular columnar shape the size of which in the direction of an axis of rotation R is smaller than the size of the shape in the direction perpendicular to the axis of rotation R. In the example shown in FIG. 2, the axis of rotation R is parallel to the axis Y. The torque produced by the drive motor 64 rotates the flat screw 110 around the axis of rotation R. The flat screw 110 has a principal surface 111, a groove forming surface 112 opposite from the principal surface 111, and a coupling surface 113, which couples the principal surface 111 and the groove forming surface 112 to each other. FIG. 3 is a perspective view diagrammatically showing the flat screw 110. For convenience, FIG. 3 shows the state shown in FIG. 2 but reversed in the upward/downward direction.

A first groove 114 is formed at the groove forming surface 112 of the flat screw 110, as shown in FIG. 3. The first groove 114 has, for example, a central section 115, a coupling section 116, and a material introduction section 117. The central section 115 faces a communication hole 126 formed in the barrel 120. The central section 115 communicates with the communication hole 126. The coupling section 116 couples the central section 115 to the material introduction section 117. In the illustrated example, the coupling section 116 is formed in a spiral shape from the central section 115 toward the outer circumference of the groove forming surface 112. The material introduction section 117 is formed at the outer circumference of the groove forming surface 112. That is, the material introduction section 117 is formed at the coupling surface 113 of the flat screw 110. The material supplied from the material supplier 10 is introduced from the material introduction section 117 into the first groove 114 and conveyed through the coupling section 116 and the central section 115 to the communication hole 126 formed in the barrel 120. In the illustrated example, two first grooves 114 are formed.

The number of first grooves 114 is not limited to a specific number. Although not shown, three or more first grooves 114 may be formed, or only one first groove 114 may be formed.

Figure 4:
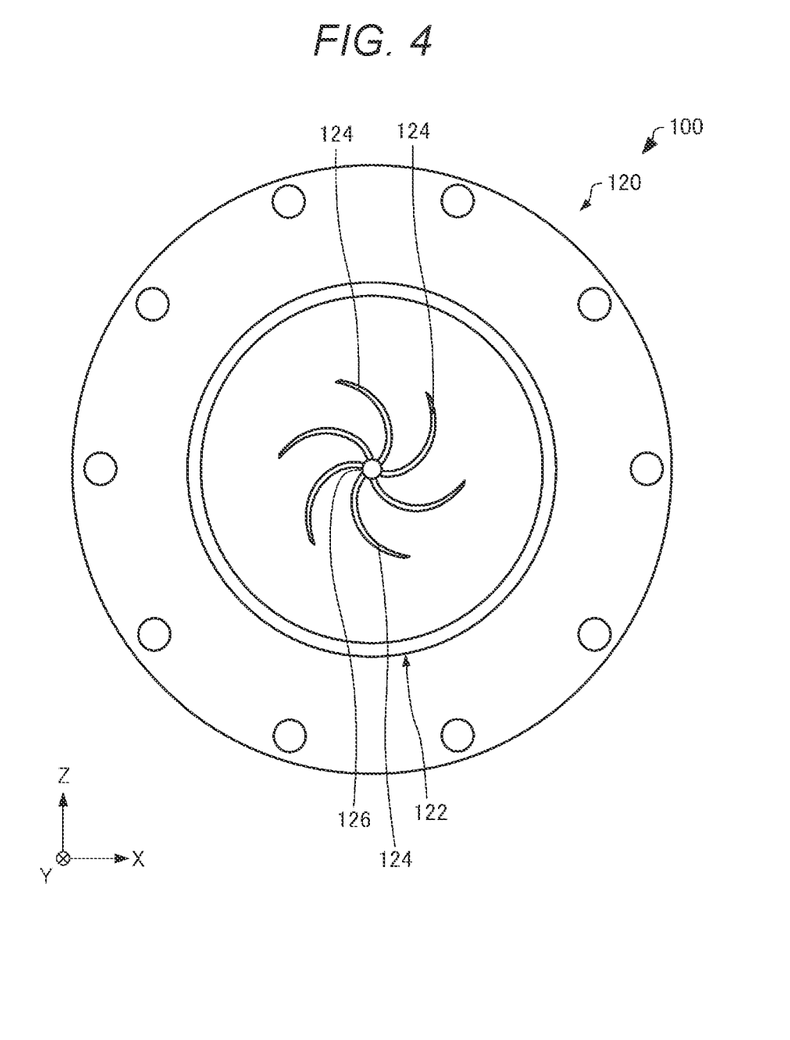
FIG. 4 diagrammatically shows a barrel of the injection molder according to the embodiment.

The barrel 120 is provided so as to face the flat screw 110, as shown in FIG. 2. The barrel 120 has a flat screw facing surface 122, which faces the groove forming surface 112 of the flat screw 110. The flat screw facing surface 122 faces the groove forming surface 112 in the Y-axis direction. The communication hole 126 is formed at the center of the flat screw facing surface 122. FIG. 4 diagrammatically shows the barrel 120.

A second groove 124 and the communication hole 126 are formed at the flat screw facing surface 122 of the barrel 120, as shown in FIG. 4. The second groove 124 is formed of a plurality of second grooves 124. In the illustrated example, six second grooves 124 are formed, but the number of second grooves 124 is not limited to a specific number. The plurality of second grooves 124 are formed around the communication hole 126 when viewed in the Y-axis direction. The second grooves 124 each have one end coupled to the communication hole 126 and extend in the form of a spiral from the communication hole 126 toward the outer circumference of the screw facing surface 122. The second grooves 124 each have the function of guiding the plasticized material to the communication hole 126. The communication hole 126 causes the plasticized material to flow out of the barrel 120.

The second grooves 124 do not each necessarily have a specific shape and may have, for example, a linear shape. The one end of each of the second grooves 124 may not be coupled to the communication hole 126. Furthermore, the second grooves 124 may not be formed at the screw facing surface 122. In consideration of efficient guidance of the plasticized material to the communication hole 126, however, the second grooves 124 are preferably formed at the screw facing surface 122.

The heater 130 is provided in the barrel 120, as shown in FIG. 2. The heater 130 heats the material supplied to the space between the flat screw 110 and the barrel 120. The heater 130 heats the material supplied to the first grooves 114. The heater 130 is controlled by the controller 50. The plasticizer 60 uses the flat screw 110, the barrel 120, and the heater 130 to produce the plasticized material by heating the material as the material is conveyed toward the communication hole 126, and causes the produced plasticized material to flow via the communication hole 126 to the injection mechanism 70. The heater 130 may not be provided in the barrel 120, and may, for example, be provided in the flat screw 110.

The injection mechanism 70 includes, for example, a cylinder 72, a plunger 74, and a plunger driver 76. The cylinder 72 is a substantially cylindrical member coupled to the communication hole 126. The plunger 74 moves inside the cylinder 72. The plunger 74 is driven by the plunger driver 76, which is formed of a motor, gears, and other components. The plunger driver 76 is controlled by the controller 50. The cylinder 72 may be coupled to a channel downstream from the communication hole 126.

The injection mechanism 70 performs metering operation and injection operation by causing the plunger 74 to slide in the cylinder 72. The metering operation refers to the operation of moving the plunger 74 in the −X-axis direction away from the communication hole 126 to guide the plasticized material located in the communication hole 126 into the cylinder 72 and metering the plasticized material in the cylinder 72. The injection operation refers to the operation of moving the plunger 74 in the +X-axis direction toward the communication hole 126 to inject the plasticized material in the cylinder 72 into the die section 30 via the nozzle 80.

A nozzle hole 82, which communicates with the communication hole 126, is formed in the nozzle 80. The nozzle 80 causes the plasticized material supplied from the plasticizer 60 to be injected toward a molding die 31 of the die section 30. Specifically, when the metering operation and the injection operation described above are performed, the plasticized material metered in the cylinder 72 is sent from the injection mechanism 70 to the nozzle hole 82 via the communication hole 126. The plasticized material is then injected via the nozzle hole 82 into the molding die 31.

The die section 30 includes the molding die 31 and a push-out mechanism 32. The plasticized material sent to the nozzle hole 82 is injected via the nozzle hole 82 into a cavity 140 of the molding die 31. Specifically, the molding die 31 includes a movable die 31*a* and a fixed die 31*b* facing each other, as well as the cavity 140 between the movable die 31*a* and the fixed die 31*b*. The cavity 140 is a space corresponding to the shape of the molded product. The molding die 31 will be described later in details.

The push-out mechanism 32 is provided at the movable die 31*a*. The push-out mechanism 32 releases the molded product from the molding die 31. The push-out mechanism 32 includes, for example, an ejector pin 33, a support plate 34, a support rod 35, a spring 36, a push-out plate 37, and a thrust bearing 38.

The ejector pin 33 is a rod-shaped member used to push out the molded product formed in the cavity 140. The ejector pin 33 is provided so as to pass through the movable die 31*a* and reach the cavity 140.

The support plate 34 is a plate member that supports the ejector pin 33. The ejector pin 33 is fixed to the support plate 34. The support rod 35 is fixed to the support plate 34. The support rod 35 is inserted through a through hole formed in the movable die 31*a*.

The spring 36 is disposed in the space between the movable die 31*a* and the support plate 34. The support rod 35 is inserted into the spring 36. The spring 36 urges the support plate 34 in such a way that the head of the ejector pin 33 forms a portion of the wall surface of the cavity 140 during molding.

The push-out plate 37 is fixed to the support plate 34. The thrust bearing 38 is attached to the push-out plate 37. The thrust bearing 38 is so provided that the head of a ball screw 44 does not damage the push-out plate 37. The thrust bearing 38 may be replaced, for example, with a thrust slide bearing.

The die clamper 40 includes, for example, a die driver 42 and the ball screw 44. The die driver 42 is formed, for example, of a motor, gears, and other components. The die driver 42 is coupled to the movable die 31*a* via the ball screw 44. The die driver 42 is controlled by the controller 50. The ball screw 44 transmits the power by a driving of the mold driver 42 to the movable die 31*a*. The mold clamper 40 opens and closes the molding die 31 by moving the movable die 31*a* via the die driver 42 and the ball screw 44.

1.3. Molding Die

Figure 5:
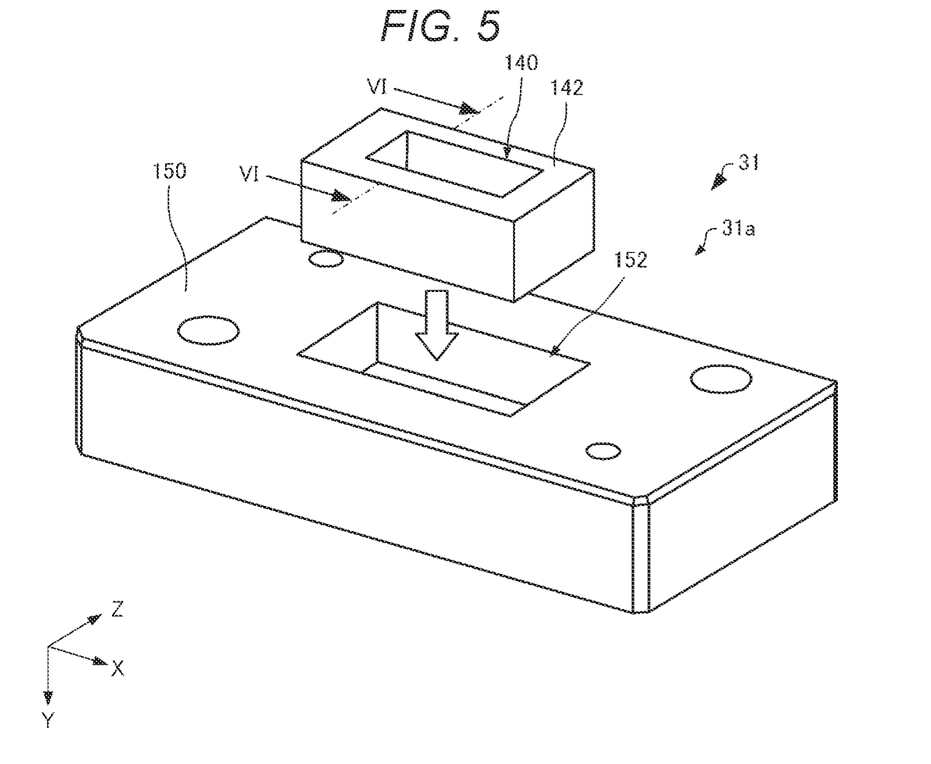
FIG. 5 is an exploded perspective view diagrammatically showing a molding die of the injection molder according to the embodiment.
Figure 6:
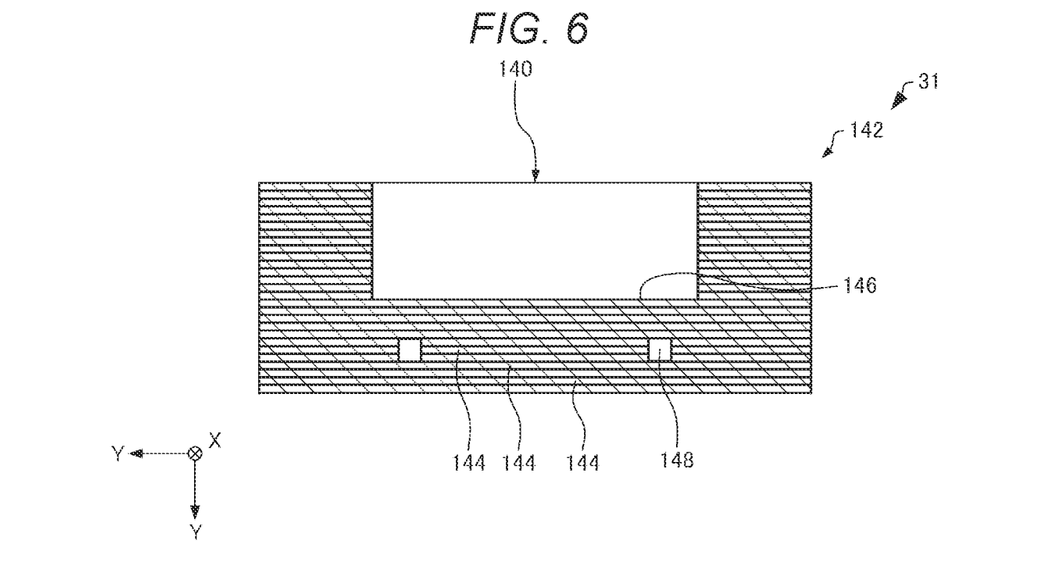
FIG. 6 is a cross-sectional view diagrammatically showing the molding die of the injection molder according to the embodiment.

FIG. 5 is an exploded perspective view diagrammatically showing the movable die 31*a* of the molding die 31. FIG. 6 is a cross-sectional view of a laminate 142 of the movable die 31*a* taken along the line VI-VI in FIG. 5, which diagrammatically shows the laminate 142.

The movable die 31*a* of the molding die 31 includes, for example, the laminate 142 and a master die 150, as shown in FIGS. 5 and 6. The molding die 31 is used with the injection molder 100.

The movable die 31*a* of the molding die 31 is formed by fitting the laminate 142 into a recess 152 formed in the master die 150, as shown in FIG. 5. The material of the master ide 150 is, for example, metal.

The laminate 142 has a plurality of layers 144, as shown in FIG. 6. The laminate 142 is formed of the plurality of layers 144 stacked on each other. The number of plurality of layers 144 is not limited to a specific number. The laminate 142 is a core.

The laminate 142 has the cavity 140. The shape of the cavity 140 corresponds to the shape of the molded product to be molded by the injection molder 100. A through hole which is not shown but into which the ejector pin 33 is inserted is formed at a bottom surface 146 of the cavity 140. The bottom surface 146 of the cavity 140 is formed of a layer 144. In the illustrated example, the bottom surface 146 faces in the −Y-axis direction.

The surface roughness of the cavity 140 of the laminate 142 is, for example, smaller than or equal to 2 μm, preferably smaller than or equal to 1.5 μm, more preferably smaller than or equal to 1.4 μm. The surface roughness of the cavity 140 of the laminate 142 is, for example, greater than or equal to 0.1 μm. The "surface roughness of the cavity 140" refers to the surface roughness of the bottom surface 146 of the cavity 140. The surface roughness is measured with a 3D shape measuring apparatus.

The laminate 142 includes a cooling tube 148. In the illustrated example, the cooling tube 148 is formed in the +Y-axis direction in the cavity 140. A refrigerant that cools the molded product flows through the cooling tube 148. The refrigerant is, for example, water.

The laminate 142 contains, for example, metal particles, resin, and a compatibilizer.

The material of the metal particles contained in the laminate 142 is amorphous metal. The amorphous metal is metal that is amorphous. The primary components of the amorphous metal are, for example, iron (Fe), cobalt (Co), and nickel (Ni). The "primary components of the amorphous metal" are components the total content of which is 70 mass percent of the amorphous metal or greater. The amorphous metal may contain, for example, silicon (Si), boron (B), chromium (Cr), tungsten (W), niobium (Nb), tantalum (Ta), titanium (Ti), zirconium (Zr), or hafnium (Hf), in addition to the primary components described above.

The metal particles contained in the laminate 142 each have, for example, a spherical shape. The metal particles are formed, for example, by atomization. Spherical metal particles made of the amorphous metal can be produced by atomization.

An average particle diameter $D_{10}$ of the metal particles contained in the laminate 142 is, for example, smaller than or equal to 9 μm, preferably greater than or equal to 0.5 μm but smaller than or equal to 5 μm, more preferably greater than or equal to 1 μm but smaller than or equal to 3 μm. An average particle diameter $D_{50}$ of the metal particles is smaller than or equal to 23 μm, preferably greater than or equal to 0.5 μm but smaller than or equal to 10 μm, more preferably greater than or equal to 1 μm but smaller than or equal to 5 μm, still more preferably greater than or equal to 1 μm but smaller than or equal to 4.1 μm. An average particle diameter $D_{90}$ of the metal particles is, for example, smaller than or equal to 49 μm, preferably greater than or equal to 0.5 μm but smaller than or equal to 10 μm, more preferably greater than or equal to 1 μm but smaller than or equal to 8 μm.

The "average particle diameter $D_{10}$" is the particle diameter defined when the cumulative frequency in a volume-based particle diameter histogram is 10%. The "average particle diameter $D_{50}$" is the particle diameter defined when the cumulative frequency in the volume-based particle diameter histogram is 50%. The "average particle diameter $D_{90}$" is the particle diameter defined when the cumulative frequency in the volume-based particle diameter histogram is 90%. The average particle diameters $D_{10}$, $D_{50}$, and $D_{90}$ are measured by a particle diameter distribution measuring apparatus.

The content of the metal particles in the laminate 142 is, for example, greater than or equal to 20 percent by volume but smaller than or equal to 40 percent by volume, preferably greater than or equal to 30 percent by volume but smaller than or equal to 40 percent by volume, more preferably greater than or equal to 35 percent by volume but smaller than or equal to 40 percent by volume.

The metal particles contained in the laminate 142 are coated with the compatibilizer. The compatibilizer with which the metal particles are coated is, for example, a silane coupling agent. The material of the silane coupling agent is, for example, 3-mercaptopropyltrimethoxysilane.

Examples of the resin contained in the laminate 142 may include polyphenylene sulfide (PPS), ABS resin, polypropylene (PP), polyethylene (PE), polyacetal (POM), polyvinyl chloride (PVC), polyamide (PA), polylactic acid (PLA), polycarbonate (PC), modified-polyphenylene ether, polybutylene terephthalate, polyethylene terephthalate, polysulfone (PSU), polyether sulfone (PES), polyarylate (PAR), polyimide (PI), polyamide imide (PAI), polyether imide (PEI), and polyether ether ketone (PEEK). The metal particles coated with the compatibilizer are provided in the resin.

1.4. Method for Manufacturing Molding Die
1.4.1. Overall Procedure

Figure 7:
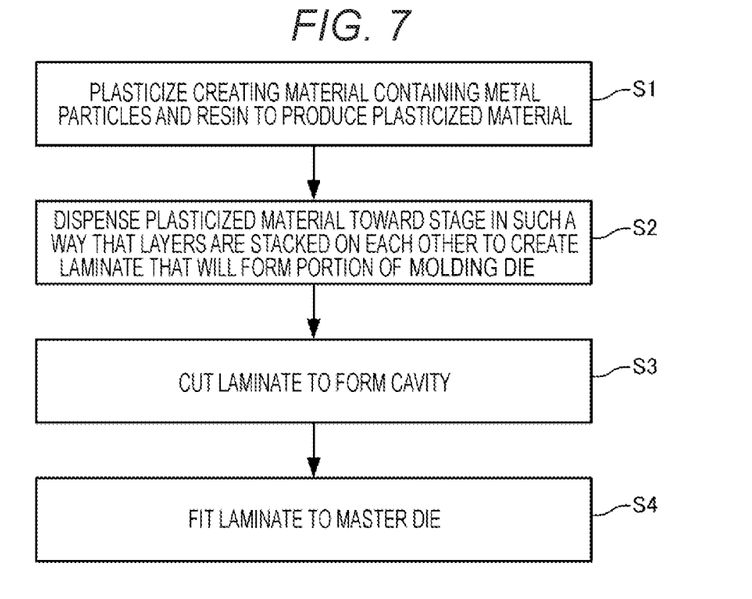
FIG. 7 is a flowchart for describing a method for manufacturing the molding die of the injection molder according to the embodiment.

A method for manufacturing the molding die 31 according to the present embodiment will next be described with reference to the drawings. FIG. 7 is a flowchart for describing the method for manufacturing the molding die 31 according to the present embodiment.

A creating material containing metal particles and resin is first plasticized to produce a plasticized material as step S1, as shown in FIG. 7. The creating material includes the metal particles, the resins, and the compatibilizer described above. The content of the metal particles in the creating material is equal to the content of the metal particles in the laminate 142.

Specifically, the metal particles are coated with the compatibilizer, and the metal particles coated with the compatibilizer and the resin are kneaded in a twin-screw extruder to produce the creating material. The creating material is then plasticized, for example, with a flat screw to produce the plasticized material, as will be described later.

Thereafter, as step S2, the plasticized material is so dispensed toward a stage that the layers 144 are stacked on each other to form the laminate 142, which will form a portion of the molding die 31.

Thereafter, as step S3, a portion of the laminate 142 is cut off to form the cavity 140. The operation of cutting the laminate 142 is performed, for example, with a cutting tool, as will be described later. The cavity 140 may instead be formed in the step of creating the laminate 142 in step S2. Step S3 may be omitted.

Thereafter, as step S4, the laminate 142 is fitted to the master die 150, as shown in FIG. 5.

The molding die 31 can be manufactured by carrying out the steps described above. The laminate 142, which will form the molding die 31, may be formed in step S2. In this case, step S3 may be omitted, and step S4 is omitted. That is, the laminate 142, which will form at least a portion of the molding die 31, only needs to be created in step S2.

1.4.2. Three-Dimensional Creator Used with Method for Manufacturing Molding Die

Figure 8:
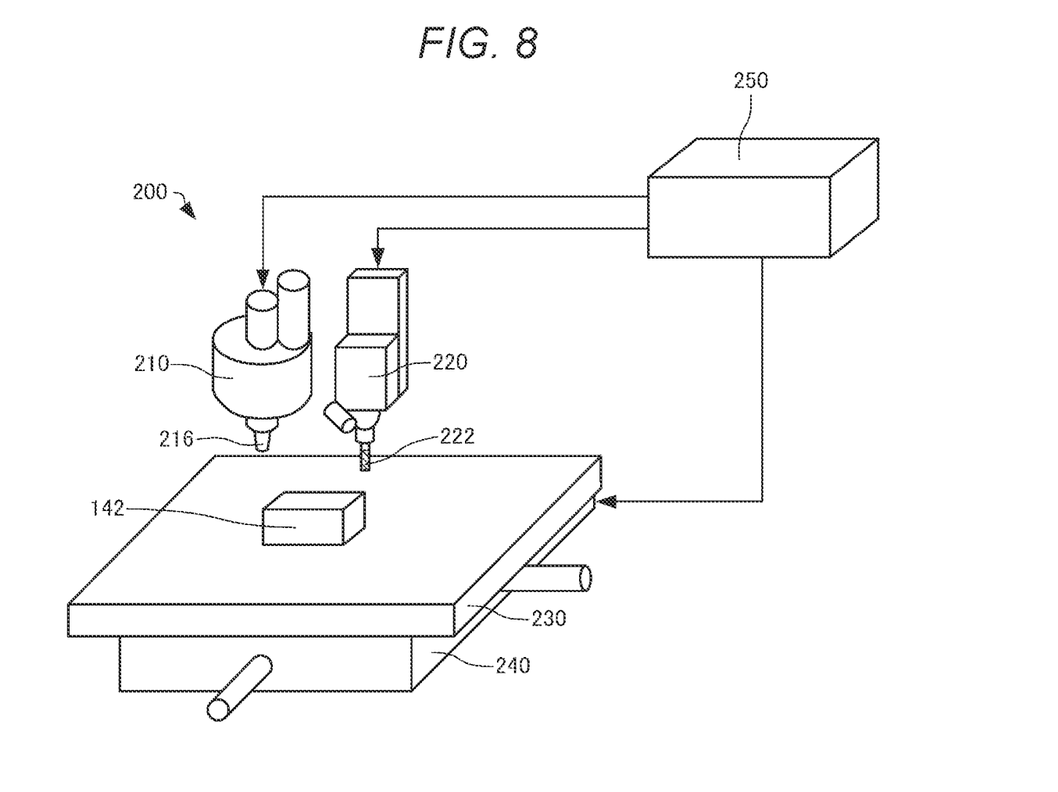
FIG. 8 is a perspective view diagrammatically showing a three-dimensional creator used with the method for manufacturing the molding die of the injection molder according to the embodiment.

The method for manufacturing the molding die 31 is performed with a three-dimensional creator. FIG. 8 is a perspective view diagrammatically showing a three-dimensional creator 200 used with the method for manufacturing the molding die 31. The three-dimensional creator 200 creates the laminate 142, which will form a portion of the molding die 31.

The three-dimensional creator 200 includes a creation unit 210, a cutting unit 220, a stage 230, a position changer 240, and a controller 250, as shown in FIG. 8.

The three-dimensional creator 200 changes the relative position between a nozzle 216 of the creation unit 210 and the stage 230 by driving the position changer 240 while dispensing the plasticized material via the nozzle 216 onto the stage 230. The creation unit 210 thus forms the laminate 142 on the stage 230.

Furthermore, the three-dimensional creator 200 changes the relative position between a cutting tool 222 of the cutting unit 220 and the stage 230 by driving the position changer 240 while rotating the cutting tool 222. The cutting unit 220 thus cuts the laminate 142 formed on the stage 230. The three-dimensional creator 200 thus creates the laminate 142 having a desired shape.

Figure 9:
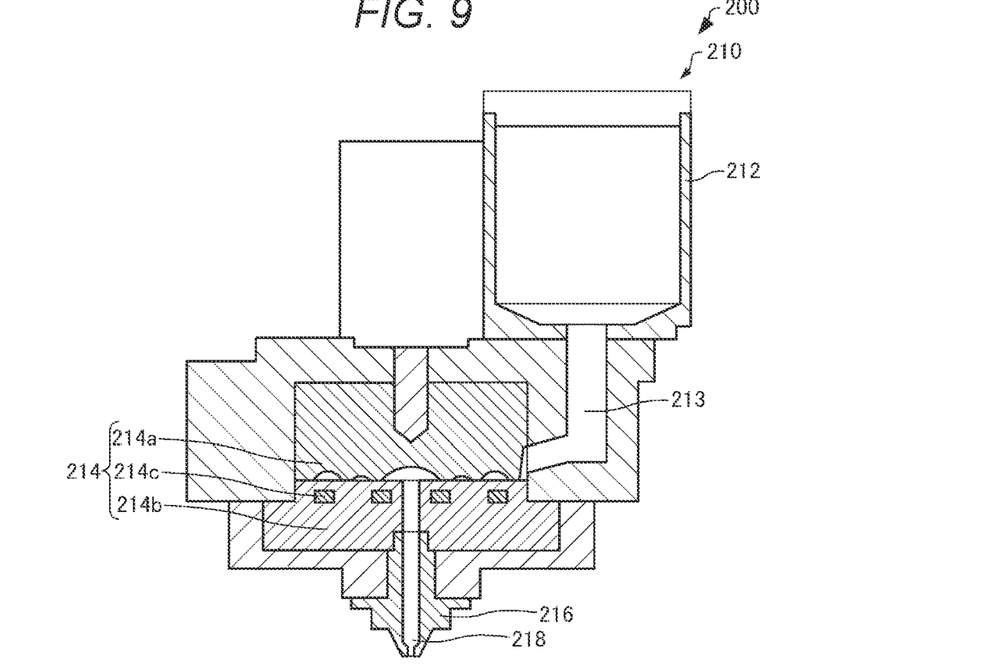
FIG. 9 is a cross-sectional view diagrammatically showing the three-dimensional creator used with the method for manufacturing the molding die of the injection molder according to the embodiment.

FIG. 9 is a cross-sectional view diagrammatically showing the creation unit 210. The creation unit 210 includes, for example, a material supplier 212, a plasticizing section 214, and the nozzle 216, as shown in FIG. 9.

The material supplier 212 supplies the plasticizing section 214 with the creating material. The creating material in the form of pellets or powder is loaded into the material supplier 212. The material supplier 212 is formed, for example, of a hopper. The material supplier 212 and the plasticizing section 214 are coupled to each other by a supply path 213 provided below the material supplier 212. The creating material loaded into the material supplier 212 is supplied to the plasticizing section 214 via the supply path 213.

The plasticizing section 214 has the same configuration as that of the plasticizer 60 of the injection molder 100 described above. That is, the plasticizing section 214 includes a flat screw 214a, a barrel 214b, and a heater 214c. The plasticizing section 214 plasticizes the creating material supplied from the material supplier 212 to produce a plasticized material having fluidity in the form of paste, and guides the produced plasticized material to a nozzle hole 218 provided in the nozzle 216.

The nozzle 216 dispenses the plasticized material produced by the plasticizing section 214 toward the stage 230.

The cutting unit 220 rotates the cutting tool 222 attached to a front end facing the stage 230 to cut the laminate 142 formed on the stage 230, as shown in FIG. 8. The cutting unit 220 cuts the laminate 142 to form, for example, the cavity 140. The cutting tool 222 is, for example, a flat end mill or a ball end mill. The controller 250 controls the cutting position by controlling the position changer 240 to change the relative position between the cutting tool 222 and the laminate 142 formed on the stage 230.

The laminate 142 formed of the stacked layers is formed on the stage 230. In the illustrated example, the laminate 142 is provided directly on the stage 230. Although not shown, the laminate 142 may be provided on the stage 230 via a base plate. The molding die 31 may then be manufactured by fitting the laminate 142 and base plate to the master die 150.

The position changer 240 supports the stage 230. In the illustrated example, the position changer 240 is configured as a 3-axis positioner that moves the stage 230 along the three axes perpendicular to each other with respect to the creation unit 210 and the cutting unit 220.

The position changer 240 may instead move the creation unit 210 and the cutting unit 220 with respect to the stage 230 without moving the stage 230. Still instead, the position changer 240 may move both the two sections: the stage 230; and the creation unit 210 and the cutting unit 220. For example, the position changer 240 may move the stage 230 in the X-axis and Y-axis directions and move the creation unit 210 and the cutting unit 220 in the Z-axis direction.

The position changer 240 may have the function of tilting the stage 230 with respect to the horizontal plane. The position changer 240 may have the function of tilting the nozzle 216 and the cutting tool 222 with respect to the horizontal plane.

The controller 250 is formed, for example, of a computer including a processor, a primary storage, and an input/output interface via which signals are inputted from and outputted to an external apparatus. The controller 250, for example, control the creation unit 210, the cutting unit 220, and the position changer 240 when the processor executes a program read into the primary storage. The controller 250 may be formed of a combination of a plurality of circuits in place of the computer.

Figure 10:
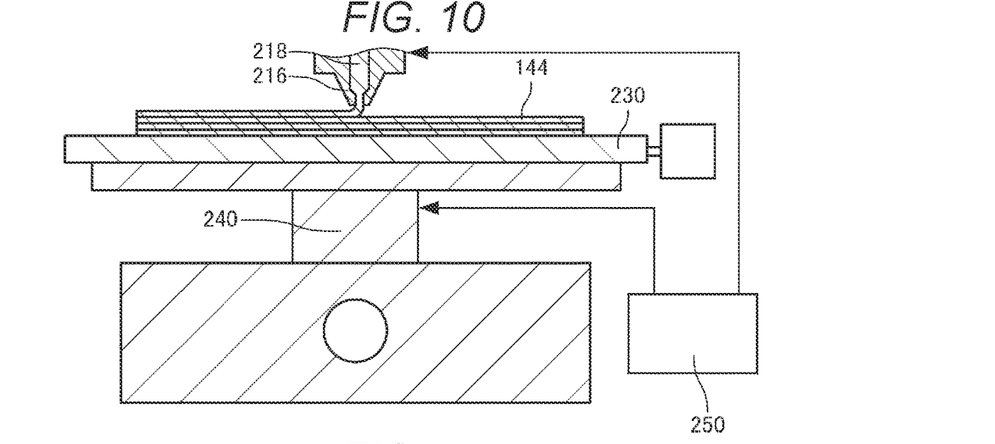
FIG. 10 is a cross-sectional view diagrammatically showing the step of manufacturing the molding die of the injection molder according to the embodiment.

FIG. 10 is a cross-sectional view diagrammatically showing the step of manufacturing the laminate 142 in the three-dimensional creator 200.

The controller 250 dispenses the plasticized material via the nozzle 216 while changing the position of the nozzle 216 with respect to the stage 230 in a direction along the upper surface of the stage 230 with the distance between the stage 230 and the nozzle 216 maintained, as shown in FIG. 10. The plasticized material dispensed via the nozzle 216 is continuously deposited on the stage 230 in a direction of the movement of the nozzle 216 to form the layers 144.

The controller 250 repeatedly scans the stage 230 with the nozzle 216 to form a plurality of layers 144. Specifically, the controller 250 moves the position of the nozzle 216 upward with respect to the stage 230 after one layer 144 is formed. The laminate 142 is then created by further stacking layers 144 on top of the previously formed layer 144.

The controller 250 may temporarily interrupt the dispensing of the plasticized material via the nozzle 216, for example, when the nozzle 216 is moved upward after one layer 144 is deposited or when a discontinuous pass is created. In this case, the controller 250 controls a butterfly valve or any other component that is not shown but is provided in the nozzle hole 218 to stop dispensing the plasticized material via the nozzle 216. After changing the position of the nozzle 216, the controller 250 resumes the deposition of the plasticized material from the changed position of the nozzle 216 by opening the butterfly valve to resume dispensing of the plasticized material.

1.4.3. Effects and Advantages

The method for manufacturing the molding die 31 includes plasticizing a creating material containing metal particles and resin to produce a plasticized material, and dispensing the plasticized material toward the stage 230 to stack the layers 144 on each other to create the laminate 142, which will form at least a portion of the molding die 31, and the average particle diameter $D_{50}$ of the metal particles is smaller than or equal to 23 μm.

As described above, since a creating material containing metal particles and resin is used in the method for manufacturing the molding die 31, the heat retained in the laminate 142 can be reduced, so that the period required to cool a molded product can be shortened as compared with a case where a creating material made of resin is used. Furthermore, the molding die 31 that is unlikely to cause filling failure and warpage in the molded product can be manufactured as compared with a case where a creating material made of metal is used. Therefore, the molding die 31 that is unlikely to cause filling failure and warpage in the molded product can be manufactured with the heat retained in the laminate 142 reduced and the period required to cool the molded product hence shortened.

Furthermore, in the method for manufacturing the molding die 31, the average particle diameter $D_{50}$ of the metal particles is smaller than or equal to 23 μm. The surface roughness of the cavity 140 can therefore be reduced. The small surface roughness can also be maintained through repeated use of the molding die 31. High-quality created products can thus be created. When the average particle diameter $D_{50}$ of the metal particles is greater than 23 μm, for example, the metal particles falls off when the laminate is so cut that a cavity is formed, resulting in a cavity having large surface roughness. In addition, repeated use of the molding die 31 causes part of the metal particles to fall off and therefore increases the surface roughness. High-quality created products cannot therefore be created.

In the method for manufacturing the molding die 31, the average particle diameter $D_{50}$ of the metal particles is greater than or equal to 1 μm but smaller than or equal to 5 μm. In the method for manufacturing the molding die 31, since the average particle diameter $D_{50}$ of the metal particles is greater than or equal to 1 μm, the metal particles and the resin can be readily kneaded. When the average particle diameter $D_{50}$ of the metal particles is smaller than 1 μm, the surface to volume ratio of the metal particles increases. When the ratio increases, the surface becomes unstable, resulting in kneading difficulty. Furthermore, since the average particle diameter $D_{50}$ of the metal particles is smaller than or equal to 5 μm, the surface roughness of the cavity 140 can be further reduced.

In the method for manufacturing the molding die 31, the plasticized material contains a compatibilizer. The method for manufacturing the molding die 31 therefore allows improvement in the adhesion between the metal particles and the resin.

In the method for manufacturing the molding die 31, the metal particles contained are coated with the compatibilizer. The method for manufacturing the molding die 31 therefore allows more reliable improvement in the adhesion between the metal particles and the resin.

In the method for manufacturing the molding die 31, the content of the metal particles in the creating material is greater than or equal to 20 percent by volume but smaller than or equal to 40 percent by volume. The method for manufacturing the molding die 31, in which the content of the metal particles is greater than or equal to 20 percent by volume, allows an increase in the thermal conductivity and rigidity of the laminate 142. Furthermore, since the content of the metal particles is smaller than or equal to 40 percent by volume, the kneading can be readily performed.

In the method for manufacturing the molding die 31, the surface roughness of the cavity 140 of the molding die 31 is smaller than or equal to 2 μm. In the method for manufacturing the molding die 31, the surface roughness of the cavity 140 can therefore be reduced.

In the method for manufacturing the molding die 31, the material of the metal particles is amorphous metal. Amorphous metals have lower thermal conductivity than metals but have higher thermal conductivity than resins. The method for manufacturing the molding die 31 therefore allows manufacture of a molding die 31 that is unlikely to cause filling failure and warpage in a molded product with the heat retained in the laminate 142 reduced and the period required to cool the molded product hence shortened.

In the method for manufacturing the molding die 31, the primary component of the amorphous metal is iron, and the metal particles each have a spherical shape. The method for manufacturing the molding die 31 therefore allows manufacture of a laminate 142 having a small difference in modulus of elasticity between first and second directions, which are perpendicular to each other, as compared with a case where the metal particles do not each have a spherical shape. The mechanical properties of the laminate 142 can thus be stabilized. Furthermore, the design flexibility can be increased.

2. EXAMPLES AND COMPARABLE EXAMPLES 2.1. Generation of laminate

2.1.1. Example 1

Figure 11:
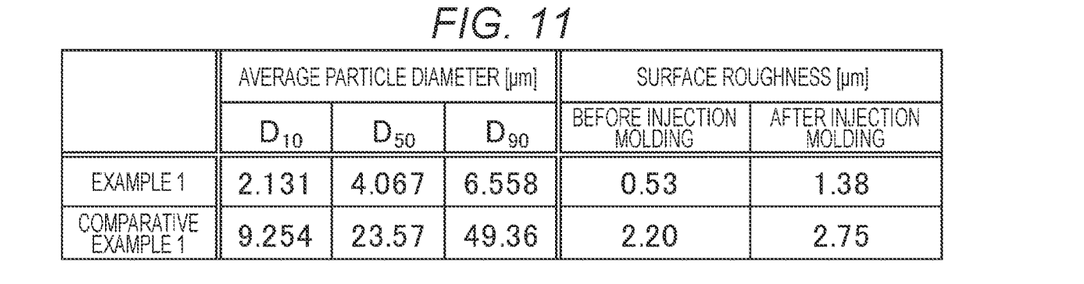
FIG. 11 is a table showing the average particle diameters of metal particles and results of evaluation of surface roughness in Examples and Comparative Examples.

To generate a laminate in Example 1, metal particles were prepared. Atomized powder "AW2-08PF-5F", which is manufactured by Epson Atmix Corporation, was used as the metal particles. The atomized powder is formed of spherical particles made of an Fe—Si—B—Cr-based amorphous alloy having the Fe group. FIG. 11 shows the average particle diameters $D_{10}$, $D_{50}$, and $D_{90}$ of the metal particles. FIG. 11 is a table showing the average particle diameters of the metal particles and results of evaluation of the surface roughness thereof.

The average particle diameters of the metal particles were measured with a particle diameter distribution measuring apparatus "HRA9230-X100" manufactured by Microtrac-Bell Corp. Methanol was used as a measurement solvent as the condition under which the average particle diameter was measured. The flow rate was set at 70%. The measurement mode was set to MT3000II. The measured refractive index was set at 1.33.

The metal particles were then coated with a compatibilizer. A silane coupling agent "KBM-803" from Shin-Etsu Chemical Co., Ltd. was used as the compatibilizer. The material of the silane coupling agent is 3-mercaptopropyltrimethoxysilane.

The metal particles coated with the compatibilizer and resin were then kneaded in a twin-screw extruder to produce a creating material. PPS was used as the resin. The content of the metal particles in the creating material was set at 40 percent by volume.

The creating material was then plasticized to produce a plasticized material, and the produced plasticized material was dispensed toward a stage to stack layers on each other to create a laminate. The laminate was created by a three-dimensional creator corresponding to FIG. 8 described above.

2.1.2. Comparative Example 1

In Comparative Example 1, a laminate was generated in the same manner as in Example 1 described above, except that atomized powder "KUAMET", which is manufactured by Epson Atmix Corporation, was used as the metal particles. The material of the metal particles used in Comparative Example 1 is the same as that in Example 1, but the average particle diameter differs in Comparative Example 1 from that in Example 1. The average particle diameters of the metal particles are shown in FIG. 11.

2.2. Evaluation of Surface Roughness

The surface roughness of a cavity of the laminate described above was measured. Specifically, the surface roughness of the bottom surface of the cavity was measured. The area over which the surface roughness was measured was set at 1 mm$^2$. The surface roughness was measured with an all-at-once 3D shape measuring apparatus "VR-5000" manufactured by KEYENCE Corporation. As the condition under which the surface roughness was measured, the magnification was set at 40×. The filter type was set to Gaussian. The low-pass filter was not used. The shape correction was not used. The high-pass filter was not used. The termination effect correction was turned on.

The laminate described above was next fitted to a master die to generate a movable die. The generated movable die was then used as a movable die of a molding die of an injection molder corresponding to FIG. 2 to perform injection molding to create a created product having a predetermined shape. The surface roughness of the cavity was then measured by using the same method described above.

FIG. 11 shows the surface roughness of the cavity before and after the injection molding. In FIG. 11, as the surface roughness of the cavity after the injection molding, Example 1 shows the surface roughness after 10 injection molding operations, that is, 10 created products were created, and Comparative Example 1 shows the surface roughness after 20 injection molding operations, that is, 20 created products were created.

FIG. 11 shows that Example 1, in which the average particle diameter $D_{50}$ was small, achieved smaller surface roughness than that in Comparative Example 1, both before and after the injection molding.

Example 1 and Comparative Example 1 both show that the surface roughness after the injection molding was greater than that before the injection molding. Note that the increase in surface roughness tended to be almost saturated after the first 20 injection molding operations, and little change in surface roughness was observed after 20 injection molding operations.

The embodiment and variations described above are presented by way of example, and the present disclosure is not limited thereto. For example, the embodiment and variations can be combined with each other as appropriate.

The present disclosure encompasses substantially the same configuration as the configuration described in the embodiment, for example, a configuration having the same function, using the same method, and providing the same result or a configuration having the same purpose and providing the same effect. Furthermore, the present disclosure encompasses a configuration in which an inessential portion of the configuration described in the embodiment is replaced with another portion. Moreover, the present disclosure encompasses a configuration that provides the same effects and advantages as those provided by the configuration described in the embodiment or a configuration that can achieve the same purpose as that achieved by the configuration described in the embodiment. Furthermore, the present disclosure encompasses a configuration in which a known technology is added to the configuration described in the embodiment.

The following contents are derived from the embodiment and variations described above.

An aspect of a method for manufacturing a molding die is a method for manufacturing a molding die used with an injection molder, the method including plasticizing a creating material containing metal particles and resin to produce a plasticized material, and dispensing the plasticized material toward a stage to stack layers on each other to create a laminate that forms at least a portion of the molding die, and an average particle diameter $D_{50}$ of the metal particles is smaller than or equal to 23 µm.

According to the method for manufacturing a molding die, a molding die that is unlikely to cause filling failure and warpage in a molded product can be manufactured with the heat retained in the laminate reduced and hence the period required to cool the molded product shortened.

In the aspect of the method for manufacturing a molding die, the average particle diameter $D_{50}$ of the metal particles may be greater than or equal to 1 µm but smaller than or equal to 5 µm.

According to the method for manufacturing a molding die, the metal particles and the resin can be readily kneaded, and the surface roughness of a cavity of the molding die can be reduced.

In the aspect of the method for manufacturing a molding die, the plasticized material described above may contain a compatibilizer.

According to the method for manufacturing a molding die, the adhesion between the metal particles and the resin can be improved.

In the aspect of the method for manufacturing a molding die, the metal particles may be coated with the compatibilizer.

According to the method for manufacturing a molding die, the adhesion between the metal particles and the resin can be more reliably improved.

In the aspect of the method for manufacturing a molding die, the content of the metal particles in the creating material may be greater than or equal to 20 percent by volume but smaller than or equal to 40 percent by volume.

According to the method for manufacturing a molding die, the thermal conductivity and rigidity of the laminate can be increased, and the kneading can be readily performed.

In the aspect of the method for manufacturing a molding die, the surface roughness of the cavity of the molding die may be smaller than or equal to 2 µm.

According to the method for manufacturing a molding die, the surface roughness of the cavity can be reduced.

In the aspect of the method for manufacturing a molding die, the material of the metal particles may be amorphous metal.

According to the method for manufacturing a molding die, a molding die that is unlikely to cause filling failure and warpage in a molded product can be manufactured with the heat retained in the laminate reduced and hence the period required to cool the molded product shortened.

In the aspect of the method for manufacturing a molding die, the primary component of the amorphous metal may be iron, and the metal particles may each have a spherical shape.

According to the method for manufacturing a molding die, the mechanical properties of the laminate can be stabilized.

An aspect of a molding die is a molding die used with an injection molder, the molding die including a laminate containing metal particles and resin, and an average particle diameter $D_{50}$ of the metal particles is smaller than or equal to 23 µm.

What is claimed is:

1. A method for manufacturing a molding die used with an injection molder, the method comprising:
   plasticizing a creating material containing metal particles, resin, and a compatibilizer that is a silane coupling agent, to produce a plasticized material; and
   dispensing the plasticized material toward a stage to stack layers on each other to create a laminate that forms at least a portion of the molding die,
   wherein an average particle diameter $D_{50}$ of the metal particles is smaller than or equal to 23 µm, and
   the metal particles are coated with the compatibilizer.

2. The method for manufacturing a molding die according to claim 1,
   wherein the average particle diameter $D_{50}$ of the metal particles is greater than or equal to 1 µm but smaller than or equal to 5 µm.

3. The method for manufacturing a molding die according to claim 1,
   wherein a content of the metal particles in the creating material is greater than or equal to 20 percent by volume but smaller than or equal to 40 percent by volume.

4. The method for manufacturing a molding die according to claim 1,
   wherein surface roughness of a cavity of the molding die is smaller than or equal to 2 µm.

5. The method for manufacturing a molding die according to claim 1,
   wherein a material of the metal particles is amorphous metal.

6. The method for manufacturing a molding die according to claim 5,
   wherein a primary component of the amorphous metal is iron, and
   the metal particles each have a spherical shape.

7. The method for manufacturing a molding die according to claim 1, wherein a material of the silane coupling agent is 3-mercaptopropyltrimethoxysilane.

8. The method for manufacturing a molding die according to claim 4,
   wherein the molding die includes the laminate and a master die with a recess, and
   the method further comprises
      cutting off the laminate to form the cavity, and
      fitting the laminate with the cavity into the recess of the master die.

9. The method for manufacturing a molding die according to claim 8,
   wherein the laminate includes a cooling tube, and
   the cooling tube is formed below the cavity in a stack direction of the layers.

* * * * *